(12) United States Patent
Harrington et al.

(10) Patent No.: US 9,788,527 B1
(45) Date of Patent: Oct. 17, 2017

(54) ADJUSTABLE WEIGHT TOY BALL

(71) Applicants: Adam Neil Harrington, Mt. Juliet, TN (US); Chris Devel Harrington, Mt Juliet, TN (US)

(72) Inventors: Adam Neil Harrington, Mt. Juliet, TN (US); Chris Devel Harrington, Mt Juliet, TN (US)

(*) Notice: Subject to any disclaimer, the term of this patent is extended or adjusted under 35 U.S.C. 154(b) by 15 days.

(21) Appl. No.: 14/487,077

(22) Filed: Sep. 15, 2014

Related U.S. Application Data

(63) Continuation of application No. 14/073,829, filed on Nov. 6, 2013, now abandoned.

(60) Provisional application No. 61/809,769, filed on Apr. 8, 2013.

(51) Int. Cl.
*A01K 15/02* (2006.01)

(52) U.S. Cl.
CPC .................................. *A01K 15/025* (2013.01)

(58) Field of Classification Search
CPC ..... A01K 15/025; A01K 15/026; A01K 93/00
USPC .................... 119/702–711; 43/44.9
See application file for complete search history.

(56) References Cited

U.S. PATENT DOCUMENTS

| | | | | |
|---|---|---|---|---|
| 2,223,823 A * | 12/1940 | Hampton | ................ | A01K 93/00 43/15 |
| 3,334,899 A * | 8/1967 | Bosko | ................ | A63B 21/0602 446/267 |
| 3,798,825 A * | 3/1974 | Popeil | .................... | A01K 93/00 43/44.9 |
| 4,842,563 A * | 6/1989 | Russell | .................. | A63B 43/04 446/221 |
| 5,381,622 A * | 1/1995 | Tregre | .................... | A01K 85/01 43/42.31 |
| 5,655,477 A * | 8/1997 | Hoffman | .............. | A01K 39/012 119/52.2 |
| 6,009,659 A * | 1/2000 | Shannon | ................ | A01K 93/00 43/43.14 |
| 6,073,581 A * | 6/2000 | Wang | .................... | A01K 15/025 119/707 |
| 6,405,681 B1 * | 6/2002 | Ward | .................... | A01K 15/026 119/707 |
| 6,836,997 B2 * | 1/2005 | Cramsey | ................ | A01K 93/00 43/42.06 |
| 8,033,253 B2 * | 10/2011 | Ritchey | ................ | A01K 15/025 119/707 |
| 8,469,865 B2 * | 6/2013 | Verheem | ............ | A63B 21/0004 446/220 |
| 8,505,232 B2 * | 8/2013 | Reynolds | ................ | A01K 93/00 43/17.5 |
| 8,911,334 B1 * | 12/2014 | Cotter | .................... | A63B 43/02 482/105 |

(Continued)

*Primary Examiner* — Marc Burgess
(74) *Attorney, Agent, or Firm* — Shane V. Cortesi

(57) ABSTRACT

The present invention relates to a toy ball. The toy ball has an exterior surface, an interior, a water chamber located in the ball interior, a water fill aperture that is located in the ball exterior surface and is in fluid communication with the water chamber, a first rope aperture located in the exterior surface, a second rope aperture located in the exterior surface, and a rope chamber extending from the first rope aperture through the ball interior and to the second rope aperture. A rope is placed in the rope chamber. The toy ball is particularly configured for use as a pet toy (e.g., dog toy). The water chamber allows the weight of the ball to be adjusted depending on the strength and weight of the pet.

14 Claims, 4 Drawing Sheets

(56) References Cited

U.S. PATENT DOCUMENTS

| | | | |
|---|---|---|---|
| 2005/0066911 A1* | 3/2005 | Lubeck | A01K 15/026 |
| | | | 119/709 |
| 2012/0103275 A1* | 5/2012 | Curry | A01K 15/025 |
| | | | 119/707 |
| 2013/0244540 A1* | 9/2013 | Shaw | A63H 33/00 |
| | | | 446/489 |

* cited by examiner

ADJUSTABLE WEIGHT TOY BALL

RELATED APPLICATIONS

This application is a continuation of U.S. patent application Ser. No. 14/073,829, entitled "Adjustable Weight Toy Ball", filed Nov. 6, 2013, which claims priority to U.S. Provisional Application No. 61/809,769, filed Apr. 8, 2013, entitled "Tuggo Dog Toy", the contents of application Ser. No. 14/073,829 and 61/809,769 are incorporated herein by reference in their entirety.

BACKGROUND

Technical Field

The present invention relates to toys, more particularly, pet rope toys.

Background of the Invention

Pets, especially dogs, enjoy playing with rope toys. Examples of rope toys range from a basic rope that is knotted at each end to ropes that are shaped like particular animals, such as giraffes.

The Romp-N-Roll Jolly Plastic Ball with Rope (Jolly Pets, Streetsboro Ohio) is another example of a rope-based dog toy. The Romp-N-Roll Jolly Plastic Ball with Rope consists of a ball with a rope that passes through two opposing ends of the ball. The rope is knotted at each end. However, the Romp-N-Roll Jolly Plastic Ball with Rope suffers from at least one significant drawback. Specifically, dogs come in a variety of different weights and strengths, and the weight of the Romp-N-Roll Jolly Plastic Ball with Rope cannot be adjusted to accommodate dogs of different weight and strengths.

Thus, there is a continuing need for rope-based pet toys.

BRIEF SUMMARY

The present invention relates to a toy. In some embodiments, the toy includes: a) a ball having an exterior surface, an interior, a water chamber located in the ball interior, a water fill aperture located in the ball exterior surface and in fluid communication with the water chamber, a first rope aperture located in the exterior surface, a second rope aperture located in the exterior surface, and a rope chamber extending from at least the first rope aperture through the ball interior and to at least the second rope aperture; and b) a rope having a proximal end, a distal end, and a length extending from the proximal end to the distal end, the rope located in the rope chamber and extending from at least the first rope aperture through the ball interior and to at least the second rope aperture.

Optionally, the ball further comprises a water plug configured to releasably seal the water fill aperture. Optionally, the first and second rope apertures are located between about 150 and 180 degrees relative to each other. Optionally, the ball further comprises an equator dividing the ball into a top half and a bottom half and the first rope aperture is located in the top half and the second rope aperture is located in the bottom half. Optionally, the rope chamber is not in fluid communication with the water chamber. Optionally, the rope has a proximal end and a distal end, and a segment of the rope proximal end cannot pass through the first rope aperture and a segment of the rope distal end cannot pass through the second rope aperture. For example, the segment of the rope proximal end and the segment of the rope distal end may each comprise a knot and the proximal knot cannot pass through the first rope aperture and the distal knot cannot pass through the second rope aperture. Optionally, the water chamber is configured to hold between about 5 and about 50 pounds of water. Optionally, the water chamber comprises at least about 5 pounds of water. Optionally, the diameter of the ball is between about 5 and about 20 inches. Optionally, the ball is comprised of plastic, preferably hard plastic (e.g. comprised of polypropylene). For example, the ball may have a Shore D durometer rating between about 30 and about 100. Optionally, the toy further includes a tube, the tube forming part of the rope chamber, the tube having a proximal end adjacent to the first rope aperture and a distal end adjacent to the second rope aperture. Optionally, the tube is generally straight. Optionally, the first rope aperture is located in a first recess of the ball exterior surface and the second rope aperture is located in a second recess of the ball exterior surface. Optionally, the tube proximal end is releasably attached to a proximal knob, the proximal knob located in the first recess and the tube distal end is releasably attached to a distal knob, the distal knob located in the second recess. Optionally, the tube proximal end and the proximal knob comprise mating threads configured to releasably attach the tube proximal end to the proximal knob and the tube distal end and the distal knob comprise mating threads configured to releasably attach the tube distal end to the distal knob. Optionally, the tube passes through the water chamber. Optionally, the tube creates a seal so that the water from the water chamber cannot come into contact with the rope. Optionally, the rope chamber further comprises a length extending from the first rope aperture to the second rope aperture, and the rope length is longer than the rope chamber length. Optionally, at least one of the proximal and distal ends of the rope is not located in the ball interior.

The invention also provides a method of preparing the toy that includes: a) providing the ball; and b) placing a rope located in the rope chamber so that the rope extends at least from the first rope aperture through the ball interior and to at least the second rope aperture.

DETAILED DESCRIPTION

Figure 1:
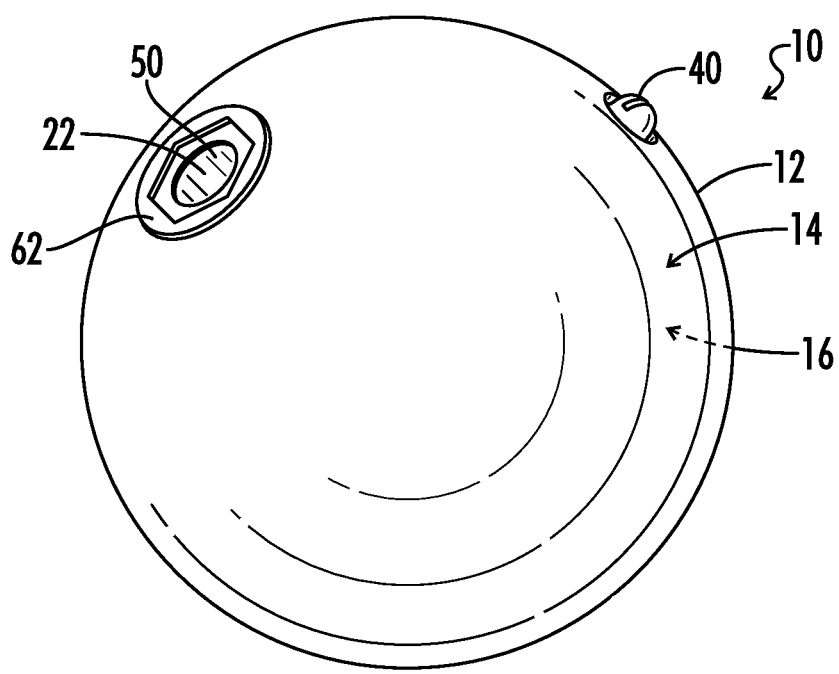
FIG. 1 illustrates a side, perspective view of a toy of one embodiment of the present invention; in this illustration, the rope has been removed.

The present disclosure provides a toy, generally designated by the numeral 10. In the drawings, not all reference numbers are included in each drawing for the sake of clarity. It will be understood that references herein to the singular form of a term encompass plural forms. In addition, positional terms such as "top", "bottom", "height," "thickness," and "length" refer to the toy 10 when in the orientation shown in the drawing, it being understood that the toy 10 may assume different orientations in use.

Figure 2:
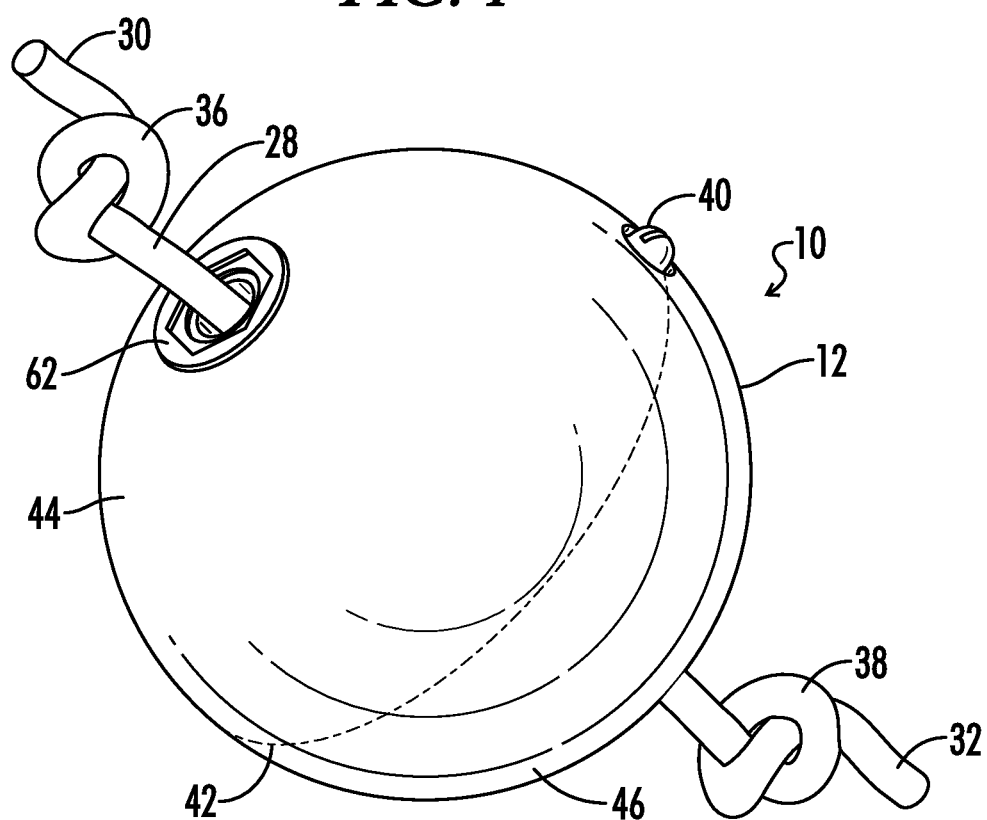
FIG. 2 illustrates a side perspective view of the toy of FIG. 1 with a rope passing through the proximal and distal knobs, first and second rope apertures and the ball interior.
Figure 3:
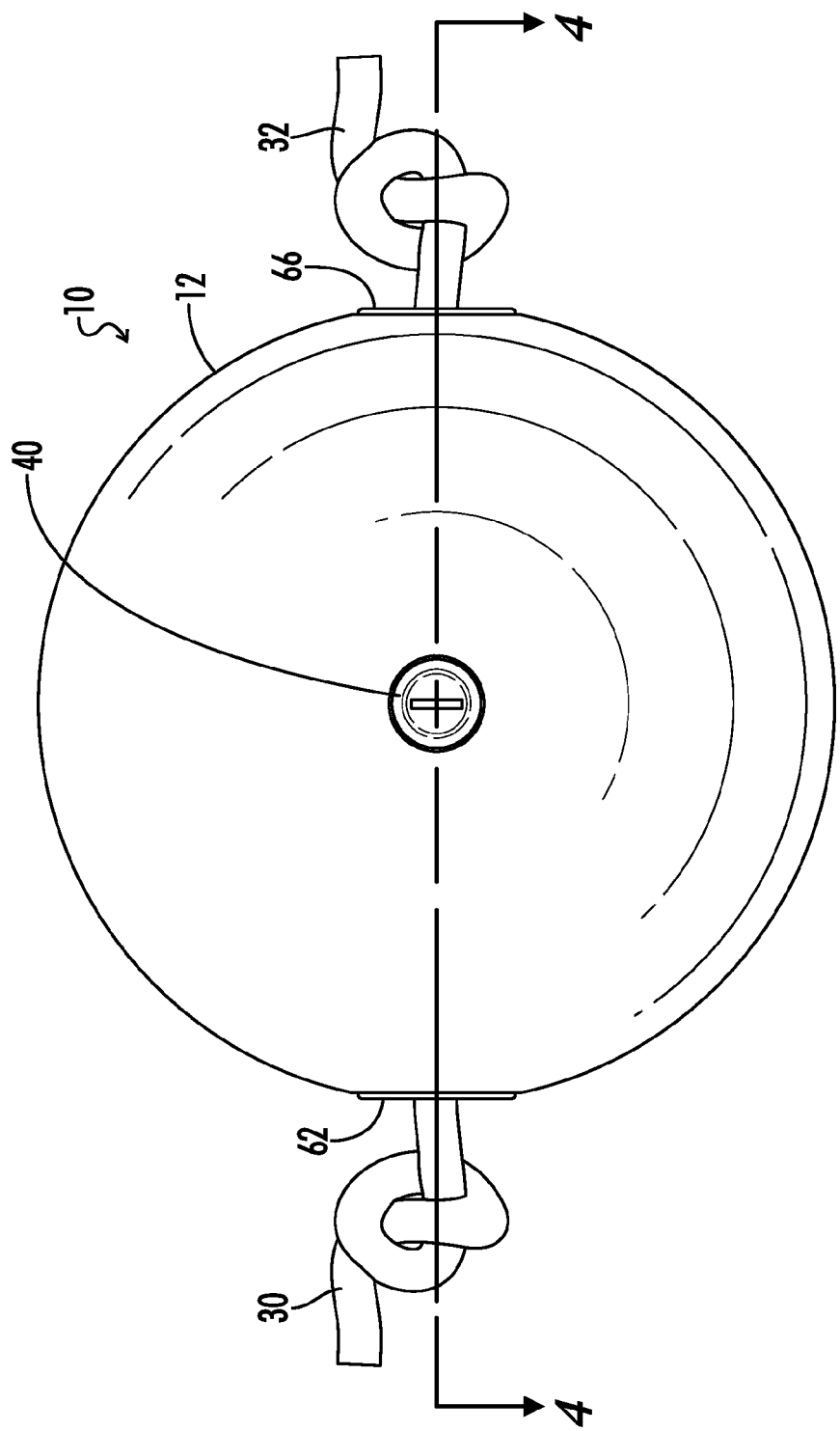
FIG. 3 illustrates a top plan view of the toy of FIG. 2.
Figure 4:
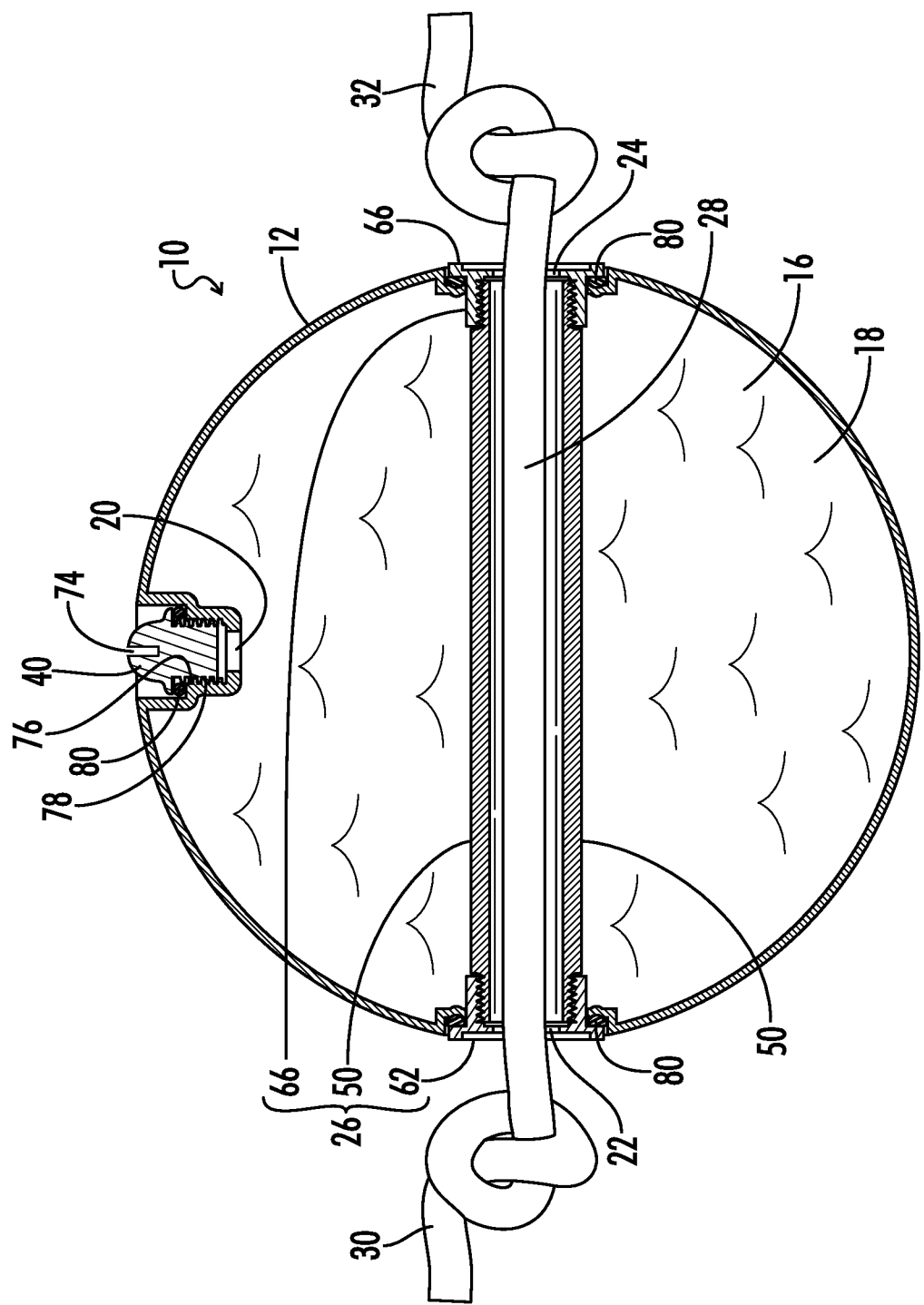
FIG. 4 is a sectional view of the toy of FIG. 3 taken along line 4-4 of FIG. 3.
Figure 5:
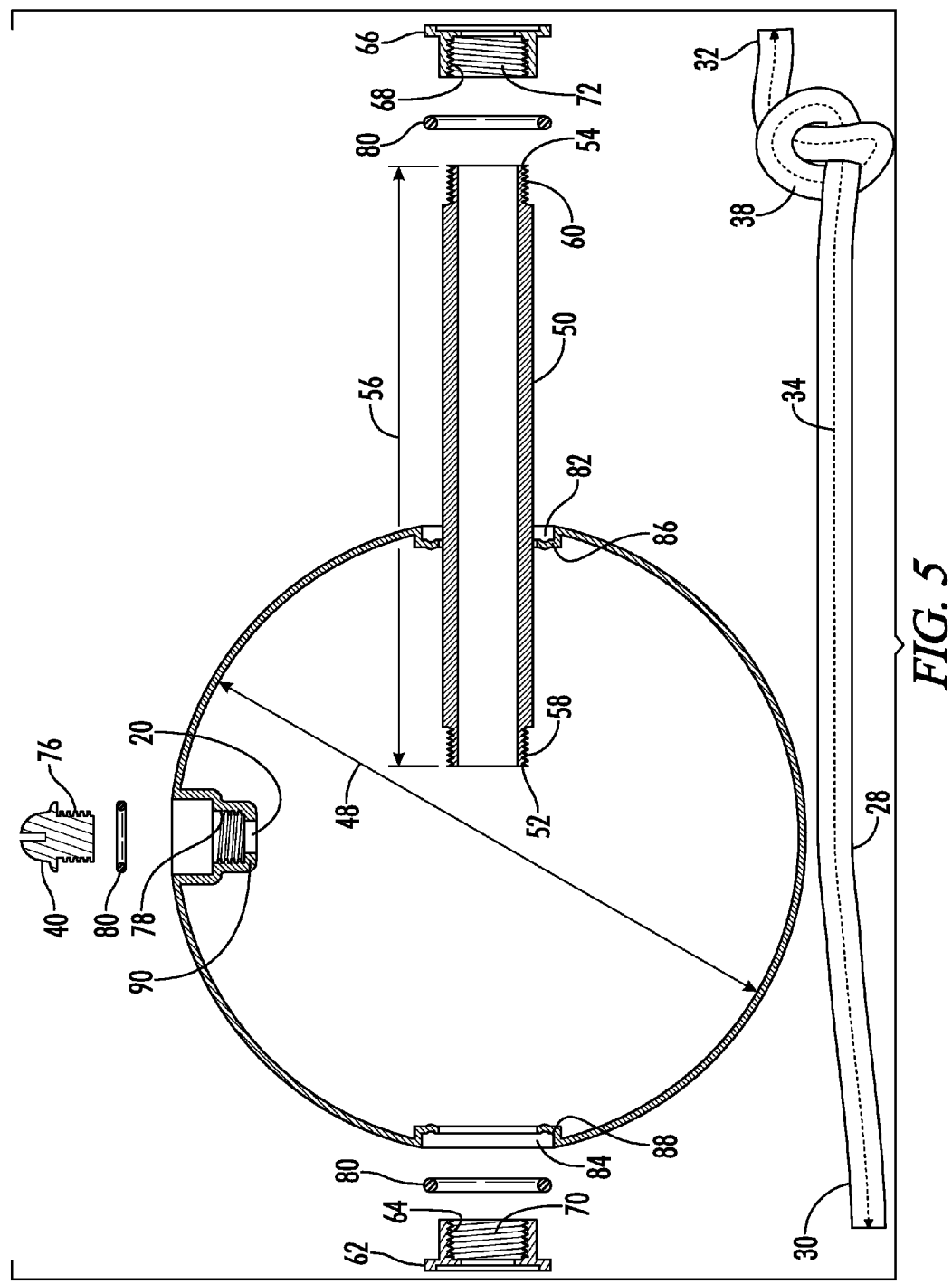
FIG. 5 is an exploded sectional view of the toy of FIG. 3 taken along line 4-4 of FIG. 3.

The pet toy 10 includes a ball 12 having an exterior surface 14, an interior 16, a water chamber 18 located in the ball interior 16, a water fill aperture 20 that is located in the ball exterior surface 14 and that is in fluid communication with the water chamber 18, a first rope aperture 22 located in the exterior surface 14, a second rope aperture 24 located in the exterior surface 14 at a different location as compared to the first rope aperture 22, and a rope chamber 26 extending from at least the first rope aperture 22 through the ball interior 16 and to at least the second rope aperture 24. (Optionally, the rope chamber 26 extends from the proximal knob 62 to the distal knob 66, both of which are identified in detail below). The pet toy 10 further includes a rope 28 having a proximal end 30, a distal end 32, and a length 34 extending from the proximal end 30 to the distal end 32. The rope 28 is located in the rope chamber 26 and extends from at least the first rope aperture 22 through the ball interior 16 and to at least the second rope aperture 24. Preferably, the rope 28 extends beyond the first rope aperture 22 and beyond the second rope aperture 24 so that the distal and proximal ends 30 and 32 of the rope 28 extend beyond the ball 12, as best seen in FIGS. 2-4. Preferably, the length 34 of the rope 28 is greater than the length of the rope chamber 26 (as measured from the proximal knob 62 to the distal knob 66, both of which are identified in detail below) so that the proximal and distal ends 30 and 32 of the rope 28 extend beyond the ball 12, which allows a dog to grip either the proximal or distal end 30 or 32 of the rope 28. In some embodiments, the rope length 34 is between about 10 and about 60 inches and the rope diameter is between about 0.25 and about 2 inches, however, it will be understood that such dimensions are merely exemplary. Optionally, the diameter 48 of the ball 12 is between about 5 and about 20 inches and the ball 12 is comprised of plastic. Optionally, the ball 12 is comprised of hard plastic (e.g. comprised of polypropylene). For example, the ball 12 may have a Shore D durometer rating between about 30 and about 100.

Optionally, the first and second rope apertures 22 and 24 are located between about 150 and 180 degrees relative to each other (e.g., in line with each other on opposite sides of the ball 12). More preferably, in some embodiments, the ball 12 includes an equator 42 that divides the ball 12 into a top half 44 and a bottom half 46 and the first rope aperture 22 is located in the top half 44 and the second rope aperture 24 is located in the bottom half 46. For example, preferably, the first and second rope apertures 22 and 24 are located on opposite poles of the ball 12 so that the first and second rope apertures 22 and 24 are located 180 degrees apart, as best seen in FIGS. 2-5. Optionally, the water fill aperture 20 is located between about 60 and about 90 degrees relative to the first rope aperture 22, as seen in FIGS. 1-5.

The water chamber 18 may hold, for example, between about 5 to about 50 pounds of water, which allows the user to add or remove water (and hence increase or decrease the weight of the ball 12, depending on the strength and weight of the dog). Preferably, the water chamber 18 includes at least about 5 pounds of water. Preferably, the rope chamber 26 is not in fluid communication with the water chamber 18, which prevents water from contacting and weakening the rope 28.

Optionally, a segment of the rope proximal end 30 cannot pass through the first rope aperture 22 and a segment of the rope distal end 32 cannot pass through the second rope aperture 24. For example, the segment of the rope proximal end 30 and the segment of the rope distal end 32 may each comprise a knot 36 and 38 and the proximal knot 36 may be too large to pass through the first rope aperture 22 and the distal knot 38 may be too large to pass through the second rope aperture 24, as shown in FIGS. 2-4.

Optionally, the toy 10 further comprises a tube 50, which forms part of the rope chamber 26, and the tube 50 has a proximal end 52 adjacent to the first rope aperture 22 and a distal end 54 adjacent to the second rope aperture 24, and a length 56 extending from the proximal end 52 to the distal end 54. Optionally, the tube 50 is generally straight. Optionally, the first rope aperture 22 is located in a first recess 82 of the ball exterior surface 14 and the second rope aperture 24 is located in a second recess 84 of the ball exterior surface 14. Optionally, the tube proximal end 52 is releasably attached to a proximal knob 62, which is located in the first recess 82, and the tube distal end 54 is releasably attached to a distal knob 66, which is located in the second recess 84. Optionally, the tube proximal end 52 and the proximal knob 62 comprise mating threads 58 and 64 configured to releasably attach the tube proximal end 52 to the proximal knob 62. Similarly the tube distal end 54 and the distal knob 66 may comprise mating threads 60 and 68 configured to releasably attach the tube distal end 54 to the distal knob 66. Optionally, the proximal knob 62 has a hollow interior 70 and the distal knob 66 also has a hollow interior 72 and the hollow interiors 70 and 72 comprise the threads 64 and 68. Optionally, the tube 50 passes through the water chamber 18 and the tube 50 creates a seal so that the water from the water chamber 18 cannot come into contact with the rope 28. Optionally, the first and second recesses 82 and 84 may each include a lip 86 and 88 that surrounds the first and second rope apertures 22 and 24 and an O-ring 80 may be positioned between the tube proximal knob 62 and the proximal lip 86 and another O-ring 80 may be positioned between and distal knob 66 and the distal lip 88 to create a seal.

Optionally, the ball 12 further includes a water plug 40 configured to releasably seal the water fill aperture 20. In such embodiments, the plug 40 may include a fastener slot 74 and threads 76 (which mate with threads 78 on the ball 12). Optionally, the ball 12 may further include a lip 90 that surrounds the water fill aperture 20 and an O-ring 80 may be positioned between the plug 40 and the lip 90 to create a seal and prevent water from escaping the water chamber 18. In such embodiments, the user may simply insert a screw driver or a quarter into the fastener slot 74 to remove the plug 40.

The toy 10 is particularly adapted for use as a pet toy. In some embodiments, the toy 10 is used by one dog alone, in which case the rope proximal end 30 may be gripped and tugged by the dog and the weight of the ball 12 opposes the tugging force of the dog. In other embodiments, the toy 10 is designed for use as a tug of war toy 10 for two dogs, in which case the rope proximal end 30 may be gripped and tugged by the first dog and the rope distal end 32 may be gripped and tugged by the second dog and the rope 28 may slide through the ball 12 in response to the tugging action by the dogs.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention, as defined and limited solely by the following claims.

What is claimed is:

1. A toy comprising:
   a) a ball having an exterior surface, an interior, a water chamber located in the ball interior, a water fill aperture located in the ball exterior surface and in fluid communication with the water chamber, a proximal recess located in the exterior surface, a proximal rope aperture located in the proximal recess, a proximal cap in the form of a proximal knob and comprising threads and a hollow interior and seated in the proximal recess, a distal recess located in the exterior surface, a distal rope aperture located in the distal recess and located approximately 150 degrees to 180 degrees relative to the proximal rope aperture, a distal cap in the form of a distal knob and comprising threads and a hollow interior and seated in the distal recess, a tube traversing the ball interior and having a proximal end adjacent to the proximal rope aperture and a distal end adjacent to the distal rope aperture, the proximal end of the tube comprising threads mating with the proximal cap threads, a proximal o-ring surrounding the proximal cap, the proximal o-ring seated in the proximal recess, the distal end of the tube comprising threads mating with the distal cap threads, and a distal o-ring surrounding the distal cap, the distal o-ring seated in the distal recess;
   b) a rope having a proximal end, a distal end, and a length extending from the proximal end to the distal end, the rope located in the tube and extending through the ball interior, wherein the rope further comprises a proximal knot proximal to the proximal cap and a distal knot distal to the distal cap and the proximal knot cannot pass through the proximal rope aperture and the distal knot cannot pass through the distal rope aperture, and further wherein the tube creates a seal so that, when water is located in the water chamber, the water from the water chamber cannot come into contact with the rope.

2. The toy of claim 1, wherein the water chamber is configured to hold liquid and further wherein the o-rings are configured to prevent the liquid from leaking from the water chamber to the ball exterior surface.

3. The toy of claim 1, wherein the ball further comprises a water plug configured to releasably seal the water fill aperture.

4. The toy of claim 1, wherein the proximal cap comprises a proximal end and further wherein the proximal o-ring is located between the proximal end of the proximal cap and the proximal rope aperture.

5. The toy of claim 1, wherein the water chamber is configured to hold between about 5 and about 50 pounds of water and further wherein the diameter of the ball is between about 5 and about 20 inches.

6. The toy of claim 5, wherein the water chamber comprises at least about 5 pounds of water.

7. The toy of claim 1, wherein the diameter of the ball is between about 5 and about 15 inches.

8. The toy of claim 1, wherein the ball is comprised of plastic.

9. The toy of claim 1 wherein the proximal cap comprises a proximal face comprising a hexagonal head.

10. The toy of claim 1, wherein the tube is generally straight.

11. The toy of claim 1, wherein the distal cap further comprises a distal face comprising a hexagonal head.

12. The toy of claim 1, wherein the tube traverses the water chamber.

13. The toy of claim 1, wherein the tube further comprises a length extending from the proximal rope aperture to the distal rope aperture, and further wherein the rope length is longer than the rope chamber length.

14. The toy of claim 13, wherein at least one of the proximal and distal ends of the rope is not located in the ball interior.

* * * * *